June 24, 1930.  R. HUGERSHOFF  1,766,294

AEROCARTOGRAPH

Filed April 4, 1927

Inventor:
R. Hugershoff
By: Marks & Clark
Attys.

Patented June 24, 1930

1,766,294

UNITED STATES PATENT OFFICE

REINHARD HUGERSHOFF, OF DRESDEN, GERMANY, ASSIGNOR TO "IKARUS" INTERNATIONALE PATENT-VERWERTUNGS A.-G., OF VADUZ, NEAR FURSTENTUM, LIECHTENSTEIN, GERMANY

AEROCARTOGRAPH

Application filed April 4, 1927, Serial No. 180,934, and in Germany May 7, 1926.

In measuring instruments, such as have for instance been proposed for measuring pairs of measuring pictures, it has already been proposed to use spatial guides for transmitting movements. On the other hand plotting instruments for measuring pictures are known, in which the motions of the measuring device taking place in two planes intersecting one another at right angles are so distributed that the motion of the image carriers takes place in one plane and the motion of the inlet reflectors of the measuring telescope in the other plane.

The object of the invention is to provide for an accurate transmission of the motions with an instrument of compact construction, more particularly one of the kind last referred to.

According to the invention this is effected with a measuring instrument having spatial guides, by an intermediate body being interposed between a moving member, a lever of the measuring instrument or the like, and the corresponding guide, such that the intermediate body is slidable along an axis and is provided with extensions, the points of application of which at the guide on the one hand and at the moving member on the other hand are equidistant from the said axis, one extension being in the form of a circular ring or a section of a circular ring at right angles to the axis.

The accompanying drawing represents a construction example of the invention as applied to an instrument for the mensuration of measuring pictures.

Figure 1:
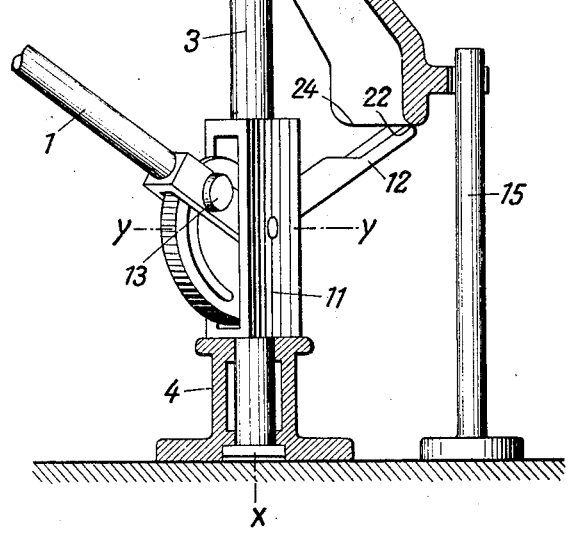
Figure 2:
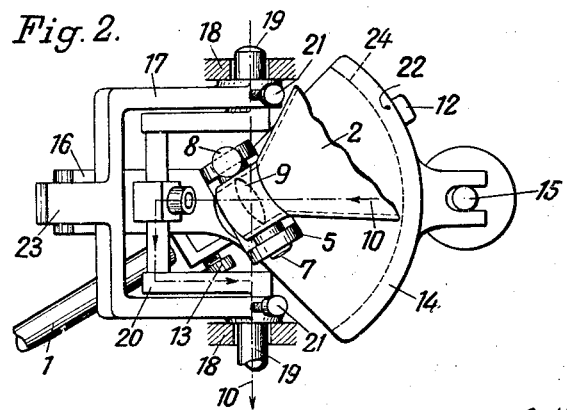

Fig. 1 shows the system for transmitting the horizontal and vertical direction component of the guide lever in a section (partially in elevation) through the vertical axis common to the guide lever and the picture carrier and Figure 2 is a plan view of the arrangement shown in Fig. 1.

The vertical axis, about which the guide 1 on the one hand and the picture carrier 2 on the other hand is capable of swinging laterally is marked $x$—$x$. This axis $x$—$x$ is embodied in a cylindrical shaft 3, which is capable of turning in a bearing 4. At the top end of the shaft 3 is a bearing bracket 5 for the picture carrier 2, which is capable of swinging laterally and of being clamped in position by a clamping screw 6 on the shaft 3. The picture carrier 2 itself can be set to any desired inclination by being tilted about a horizontal pin 7 (Fig. 2) in the bearing bracket, and clamped to the bearing bracket 5 by means of the clamping screw 8. The picture carrier 2 is so arranged that its horizontal axis of rotation intersects its vertical axis of rotation $x$—$x$ (Fig. 1) at right angles and that the front principal point of the objective 9 of the picture carrier lies approximately in the point of intersection of the said axes.

The guide lever 1 is the mechanical reproduction of the ray of light 10 towards the point on the picture to which the instrument is set, turns about the vertical axis $x$—$x$ and a horizontal axis $y$—$y$. This horizontal axis $y$—$y$ is disposed in a slotted part 11 formed in the lower part of the cylindrical shaft 3.

To the guide lever 1 an arm 12 is adjustably connected. The arm 12 is capable of being set in any desired position with respect to the lever 1, in which it can be clamped by means of the clamping screw 13.

On the lever arm 12 there rests an intermediate body 14, the lower edge of which in the example shown forms part of a circular ring. The angle at the centre of the arc of this part of a circular ring is adapted to the distance through which the guide lever 12 swings. Each tilting of the lever 1 or 12 about the horizontal axis $y$—$y$ slides the intermediate body 14 longitudinally along the vertical shaft 3. During this motion the intermediate body 14 is prevented from turning, for instance by a vertical guiding bar 15.

An arm 16 on the intermediate body 14 acts as a support for the reflector lever 17 which is preferably forked (Fig. 2) and is arranged to tilt about the shaft 19 resting in the fixed bearings 18. This shaft 19 is so arranged that its axis passes approximately through the front principal point of the objective 9 of the picture carrier. The axis of the entrance reflector 20 (Fig. 1) of the telescope coincides with the axis 19 of the reflector lever 17. The two axes are capable of being adjusted with respect to one another in a vertical plane and of being clamped together by means of clamping screws 21, so that each tilting motion of the reflector lever 17 is accompanied by an equal tilting motion of the entrance reflector 20. The tilting motions of the reflector lever 17 are exactly equal to the tilting motions of the guide lever 1 when the point of support 22 of the lever 12 and the point of support 23 of the lever 17 are exactly equidistant from the axis $x$—$x$ and the lever 17 is horizontal, when the lever 12 is also horizontal. If the angle between the guide lever 1 and its arm 12 be also made equal to the difference of outlet between the axis of the reflector lever 17 and the reflector 20 itself, the guide lever 1 will have the same inclination to the horizontal as the setting ray 10 within the picture carrier 2. In addition to this the differences in direction of the projections at any time of the guide lever on the horizontal wall exactly correspond to the horizontal angles of projection between the points in the pictures to which the instrument is set.

What I claim is:

1. In an instrument for plotting or measuring photographs, having movable parts, comprising a spatial guide for transmitting the motions of said movable parts, a member capable of motion, an intermediate body between the said member and the corresponding guide and capable of sliding along a vertical axis, extensions on the said intermediate body, having their points of support at the guide on the one hand and at the member capable of motion on the other hand equidistant from the said axis, one of the said extensions being in the form of a segment of a circular ring at right angles to the said axis, as and for the purpose set forth.

2. In a means for transmitting motion of movable parts in an instrument for plotting of measuring photographs having movable parts, comprising measuring members and a movable plotting device, comprising a spatial guide for transmitting the motions of the said measuring members and the plotting device, a member capable of motion, an intermediate body between the said member and the corresponding guide and capable of sliding along a vertical axis, extensions on the said intermediate body, having their points of support at the guide on the one hand and at the member capable of motion on the other hand, one of the said extensions being in the form of a segment of a circular ring at right angles to the said axis, as and for the purpose set forth.

In testimony whereof I have signed my name to this specification.

REINHARD HUGERSHOFF.